Dec. 31, 1968  A. W. VOGELEY ET AL  3,419,329
COMBINED OPTICAL ATTITUDE AND ALTITUDE INDICATING INSTRUMENT
Filed Jan. 2, 1964  Sheet _1_ of 3

INVENTORS
ARTHUR W. VOGELEY
ALFRED J. MEINTEL, JR.

BY

ATTORNEYS

INVENTORS
ARTHUR W. VOGELEY
ALFRED J. MEINTEL, JR.

United States Patent Office 3,419,329
Patented Dec. 31, 1968

3,419,329
COMBINED OPTICAL ATTITUDE AND ALTITUDE
INDICATING INSTRUMENT
Arthur W. Vogeley and Alfred J. Meintel, Jr., Yorktown,
Va., assignors to the United States of America as represented by the Administrator of the National Aeronautics
and Space Administration
Filed Jan. 2, 1964, Ser. No. 335,441
4 Claims. (Cl. 356—72)

ABSTRACT OF THE DISCLOSURE

This invention relates to optical instrumentation to facilitate take-off and landing of aircraft or space vehicles on planetary surfaces and serving as a primary or backup onboard instrumentation system to present vehicle altitude and attitude information on a screen located on the vehicle instrument panel and viewable by the pilot or other occupants of the vehicle.

The invention described herein may be manufactured and used by or for the Government of the United States of America for governmental purposes without the payment of any royalties thereon or therefor.

This invention relates to an optical instrument and relates with particularity to optical instrumentation for use on aircraft or space vehicles to serve as a primary or backup onboard instrumentation system to present vehicle altitude and attitude information on a screen located on the vehicle instrument panel and viewable by the pilot or other occupant of the vehicle.

The successful accomplishment in take-off and flight of supersonic aircraft and the launch and abort trajectories performed by various spacecraft are dependent in a large part on the vehicle altitude and attitude information supplied by the onboard instrumentation of the particular vehicle. Radar or barometric pressure altimeters are usually employed to determine vehicle altitude, while vehicle attitude is generally detected by gyroscopes or by visual cues observed by the pilot. Each of these known systems have their obvious disadvantages. For example, complicated circuitry and adequate electric power requirements are necessary for operating radar altimeters and gyroscopes, both of which are also subject to giving erroneous readings. Barometric pressure altimeters are slow in responding and are operative only during vehicle movement through varying atmospheric pressures. Pilot observation of visual cues supplies the most direct vehicle position information but requires large cockpit window area, and pilot head motion causes inaccurate observations.

The present invention combines the advantageous features of these prior art flight information detectors while minimizing the disadvantages thereof by utilizing a simple, optical system which may be used as a backup or prime system to supply onboard information of relative vehicle position during the take-off and flight trajectory thereof.

It is therefore an object of the present invention to provide a new and reliable optical instrument.

Another object of the present invention is the provision of a compact lightweight optical instrument for use on a moving vehicle that requires no external power source.

An additional object of the instant invention is the provision of a new optical instrument that can be used to program vehicle altitude and attitude along a calculated flight trajectory of the vehicle.

A further object of the present invention is a novel method of determining vehicle attitude and altitude during operation of the vehicle in a space environment.

An additional object of the present invention is a simple optical instrumentation system whereby a pilot of a moving vehicle can instantaneously arrive at altitude and attitude information at any point of the flight trajectory thereof.

Yet another object of the present invention is a simple instrument for combining altitude and attitude information of a moving vehicle into one single display.

According to this invention, the foregoing and other objects are attained by providing in an aircraft or space vehicle, an optical instrument for simultaneously detecting right and left peripheral environment information and displaying this information onto an instrument panel screen viewable by the pilot. The right and left peripheral information is displayed in side-by-side relationship on a screen reticle. Thus, by comparing the images received with suitable indicia on the reticle, the vehicle pilot can readily detect altitude and attitude with respect to a local vertical. The pilot of the aircraft or space vehicle, by manipulating the vehicle controls, can maintain the pair of images received on the screen at selected predetermined positions and insure proper vehicle attitude and altitude during take-off and during the flight trajectory of the particular vehicle mission. The trajectory for individual flights will be predetermined in a conventional flight plan or program for individual flights and trajectories.

A more complete appreciation of the invention and many of the attendant advantages thereof will be readily apparent as the same becomes better understood by reference to the following detailed description when considered in connection with the accompanying drawings, wherein.

Figure 1:
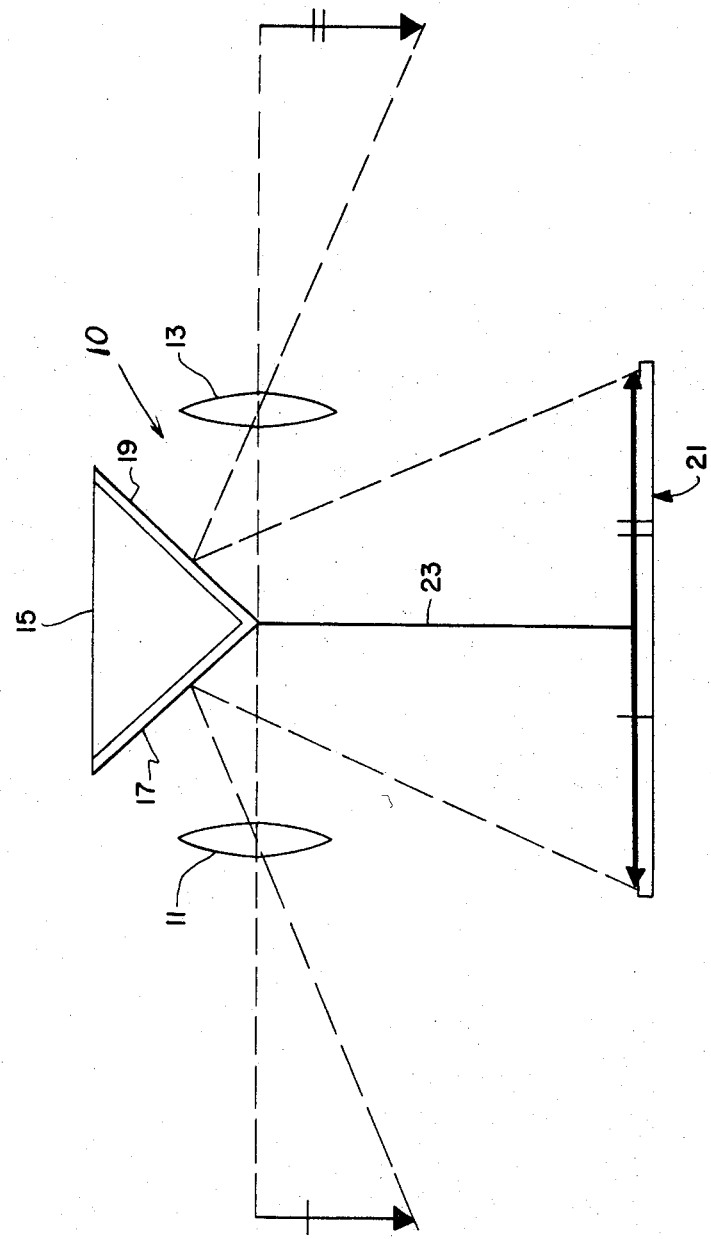
FIG. 1 is a schematic representation of the optical components of the present invention.

Referring now to the drawings, and more particularly to FIG. 1, there is shown a schematic representation of the optical components of the present invention with the entire optical instrument being generally designated by reference numeral 10. Instrument 10 includes a pair of identical lenses 11 and 13 disposed 180° to each other in spaced relationship. Lenses 11 and 13 are disposed on opposite sides of the vehicle in which instrument 10 is employed. Light rays received by lenses 11 and 13 are received by prism 15 at the respective right angle mirrored surfaces thereof; as designated by reference numeral 17 and 19. Prism 15 is positioned along the thrust axis of the vehicle in which instrument 10 is employed. The right angular mirrored surfaces 17 and 19 redirect the light rays or images received thereby onto a ground glass screen 21. Thus, the image received through lens 11, and reflected by mirrored surface 17, is directed to the left half of screen 21, as viewed in FIG. 1; while the image received through lens 13, and reflected by mirror 19, is displayed by the right half of screen 21. A field divider 23 extends from the corner of surfaces 17 and 19 perpendicular to screen 21, in a conventional manner, to restrict the light transmission from surfaces 17 and 19 to the specific left and right areas, respectively, of screen 21.

Figure 2:
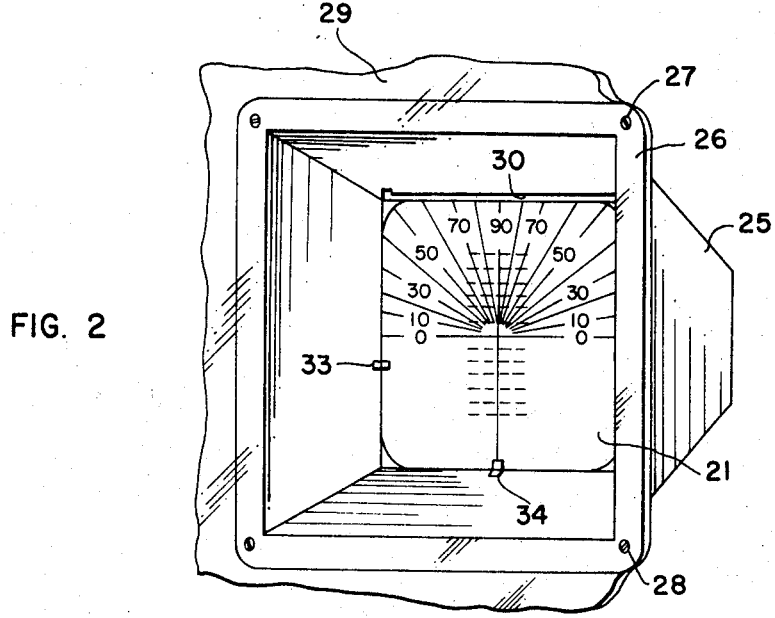
FIG. 2 is a perspective view, partly in section, of the reticle screen as positioned on a vehicle instrument panel.

Referring now more particularly to FIG. 2, screen 21 is shown disposed in a tapered recessed housing 25. Housing 25 is provided with a circumferential flange 26 and attached by suitable conventional means such for example bolts 27 and 28 to the instrument panel 29 of the particular aircraft or space vehicle. Side lighting of screen 21 is provided in housing 25 by a conventional light source 30 when the instrumentation is disposed in the instrument panel 29. The inner base area of housing 25 is provided with a plurality of conventional attachment means, such for example spring-type clips 33 and 34, to maintain screen 21 in fixed position therein and to also permit ready replacement of screen 21 by any other suitable reticle-type screen as may be required for a specific flight pattern or trajectory.

Figure 3:
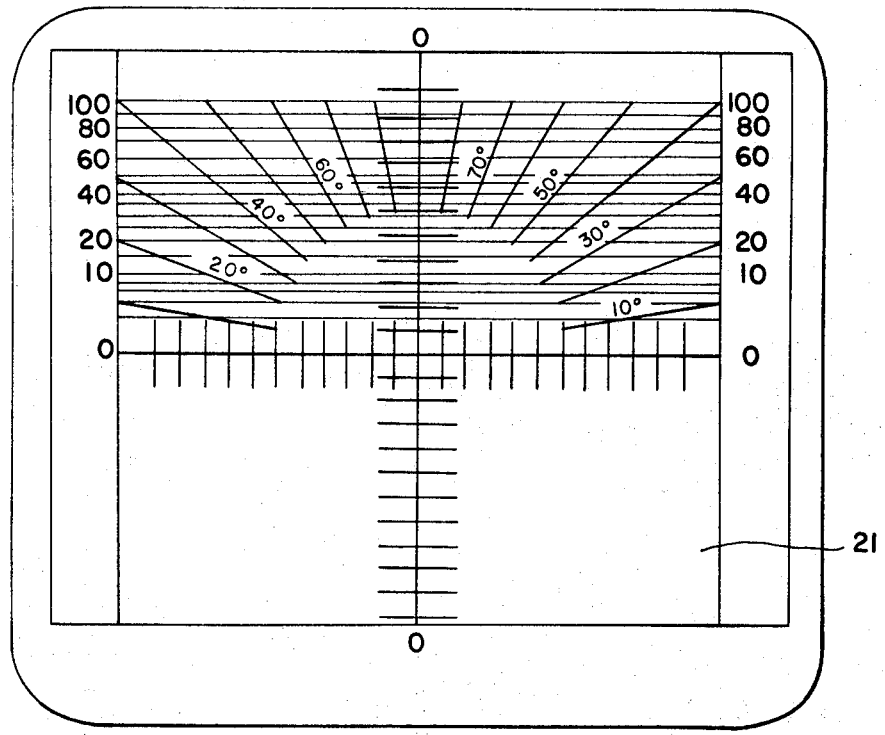
FIG. 3 is an enlarged view of a particular screen reticle for a specific flight pattern.

Referring now more specifically to FIG. 3, a specific reticle design for screen 21 is shown. As shown therein, a pair of centrally disposed crosshairs divide screen 21 into equal quadrants, with the center horizontal line representing zero degrees altitude. Angular hairlines radiating from the center toward the outer surface of screen 21 represent 10° increments in each of the upper quadrants. A plurality of horizontal hairlines extending across the length of screen 21 in the upper quadrants thereof represent vehicle altitude for a specific calculated flight trajectory, as will be further explained hereinafter. A plurality of short horizontal lines, disposed along the center vertical hairline, divide the screen field of vision into one degree increments for detecting vehicle roll maneuvers, as also will be further explained hereinafter.

For the purposes of illustration herein, the instrument 10 is assumed to be so positioned in a vehicle that the pilot would view screen 21 in instrument panel 29 while looking along the thrust axis of the vehicle through the forward vehicle window. Thus, when viewing the screen shown in FIG. 3, the Earth horizon taken as a reference image for each lens, would be shown along the zero horizontal lines of screen 21. Suitable conventional optical adjustments, not shown, are provided in the system to permit lens focusing and setting of the two horizon images exactly on the zero line and perpendicular to the local vertical.

For some vehicles, such for example as one of the vehicles presently anticipated for lunar excursions, the pilot would be seated 90° to the thrust axis. In this situation, the screen view would be optically rotated, in a conventional manner, 90° to present the true lunar horizon view to the screen.

Figure 4A:
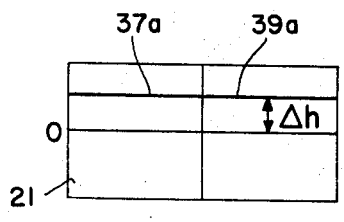
FIG. 4a is a schematic illustration of how the horizon of the Earth or Moon would appear on the screen when employing the present invention for a vehicle during increasing altitude.

Referring now to FIG. 4a, when employing the horizon of the Earth or Moon as the image disposed on the right and left side of screen 21, increasing altitude of the vehicle is shown as a displacement of the imaged horizons from the zero line. The horizon image viewed by lens 11 is designated by heavy line 37a in FIG. 4a, while that viewed by lens 13 is designated by heavy line 39a. Thus, as the vehicle increases in altitude, images 37a and 39a will move upward, as viewed in the drawing, along the incremental lines of screen 21 (FIG. 3). Since the marked horizontal increments on ground glass screen 21 are calculated for given altitudes during a specific trajectory, the pilot can readily keep track of vehicle altitude during take-off and flight by merely observing the horizon images 37a and 39a on the screen 21, with the altitude of the vehicle at any given time being represented (FIG. 4a) by the symbol $\Delta h$.

Figure 4B:
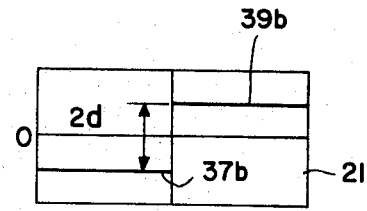
FIG. 4b is similar illustration when the vehicle is executing a roll maneuver.

During maneuvering of the vehicle, the roll thereof will be immediately detected by position change of the horizon images on screen 21, as shown in FIG. 4b and designated by reference numerals 37b and 39b. The degree of vehicle roll at any time is readily determined from screen 21 by the sum of the vertical distance lines 37b and 39b are from the central zero point on the screen reticle. As mentioned hereinbefore, roll degree is represented on the reticle screen 21 by the short horizontal hairlines disposed along the vertical center crosshair.

Figure 4C:
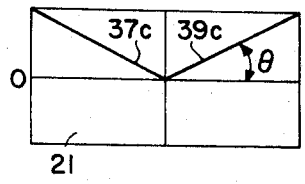
FIG. 4c is a similar schematic illustration of the screen when the vehicle is executing a pitch movement.

When the pilot of the vehicle executes a pitching movement of the vehicle, the horizon viewed by lenses 11 and 13 will be shown on screen 21 as that designated, respectively, by heavy lines 37c and 39c in FIG. 4c. The degree of vehicle pitch is a function of the angle $\theta$, as shown in FIG. 4c, which is readily determinable by viewing the angular lines in the individual quadrants of the reticle screen 21 (FIG. 3).

Figure 4D:
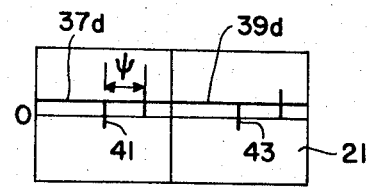
FIG. 4d is a similar illustration when the vehicle is executing a yaw movement.

For a yaw vehicle movement, the measurement of change in yaw angle is slightly complicated, but is also readily determined by the presently described invention. Thus, as shown in FIG. 4d, a specific object designated by reference numeral 41 is observed through lens 11 and displayed on screen 21 along the horizon line 37d, while a similar object 43 is observed through lens 13 and displayed on screen 21, along horizon line 39d. These observed objects 41 and 43 are then tracked along screen 21 during a suspected or induced yawing movement with the vehicle yaw angle being calculated as a function of the distance moved by objects 41 and 43 on screen 21.

Figure 5:
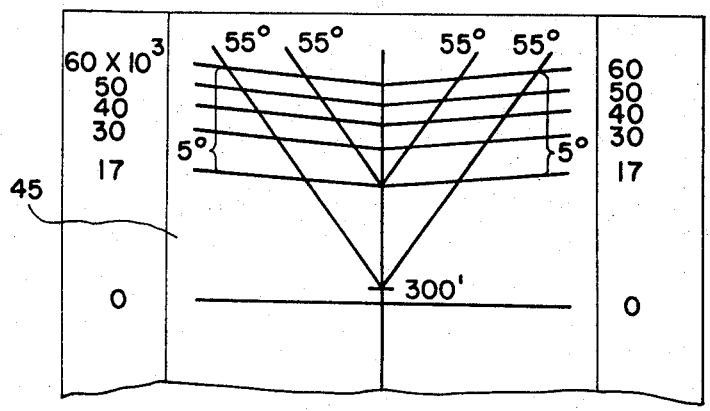
FIG. 5 is a modified screen reticle having indicia thereon of the calculated flight pattern of a lunar take-off.

Referring now to FIG. 5, a screen reticle 45 for use in a simplified calculated lunar launch is shown that may be used to replace screen 21 in instrument 10 to receive vehicle attitude and altitude information thereon for assisting in a piloted lunar launch. In operation of the instrument with this screen, it is anticipated that the pilot can perform a simple three-step pitch program launch by following the vehicle altitude and pitch attitude information received by the instrument. The first phase of this launch program may be achieved by holding the vehicle attitude during initial launch and trajectory so as to maintain the two lunar horizon images matched at the vertical centerline on screen 45 to follow the indicia thereon. Thus, the view on screen 45 would show the two views on the lunar horizon parallel and superimposed on the vertical centerline of reticle screen 45 when the vehicle is maintained vertical with respect to the lunar body. The pilot and instrument panel, as mentioned hereinbefore, are assumed to be faced 90° to the thrust axis with conventional optical rotation presenting the true lunar horizon on the screen as viewed by the pilot.

The first step in this calculated three-step pitch program occurs after a vehicle vertical attitude has been maintained for approximately eight seconds at the calculated launch speed, timed by a stopwatch, or other conventional timing mechanism or programing device. At this time, the pilot manipulates the vehicle controls to pitch the vehicle over to 55°; this pitching movement being observed and controlled by bringing the horizon images on screen 45 and over to conform to the lower 55° heavy lines, as shown in FIG. 5. The vehicle altitude at this time is calculated to be 300 feet, as shown by the short horizontal tick mark. The pilot then, by manipulating the vehicle controls, holds the horizon images parallel to the lower 55° lines until the images match the upper 55° lines, the altitude at this time being calculated to be 17,000 feet. At this point, the pilot performs the second pitch step by pitching the vehicle over 5°, by matching the horizon images to the lowermost or first 5° increment line shown in FIG. 5 and beginning at the 17,000-foot altitude point. The pilot completes the pitch-step launch by maneuvering the vehicle through small pitch-angle changes about the succeeding 5° lines shown so as to obtain zero altitude rate at about 50,000 feet; the calculated altitude for a chasing orbit to perform rendezvous with a command module or "mother" vehicle.

Reticle 45 is shown only to illustrate the principle of operation of the present invention for a specific calculated vehicle maneuver and it is obvious that more reference lines could be added for greater reading accuracy, if desired, and that different flight programs or calculated trajectories would necessitate a reticle having different indicia thereon.

In view of the description hereinbefore, it is apparent that instrument 10 acts on the same principle of operation as if two cameras were located on a vehicle and having their lenses directed 180° to each other with the pictures or planetary horizon images observed being presented in side-by-side relationship on a screen. Thus, the image angle and position, with respect to the other image on the screen, represents vehicle attitude and altitude, with respect to a local vertical plane and with respect to the planet, at any given time during the flight trajectory of the vehicle. Obviously, various focal length lenses may be employed for a given situation or instrument with the normal situation being that the reticle screen is located a distance from the lenses equal to the lenses' focal length. It is also readily apparent that at lower altitudes the vehicle pilot, or operator of instrument 10, will have to take into effect the peaks and craters displayed on the horizon image received. These variances in terrain obviously become less important as altitude increases since the distance from the vehicle to the planetary horizon becomes greater. Also optical component precision has a definite direct effect on the detectable error in instrument 10. For example, when employing lenses corrected for 30°, a distortion-free horizon for a calculated altitude of 200,000 feet is possible, while lenses corrected only for a six-to-eight degree field of view show detectable instrument error at calculated altitudes exceeding approximately 35,000 feet.

There are many obvious modifications and variations possible in light of the present teachings. For example, a pair of conventional optical mirrors may be employed to replace prism 15; additional mirrors and lenses may be added to the instrument so that more than two directional views can be presented on the screen at one time; and instrument 10 may be adjustably positioned in the vehicle to permit the view on the screen to selectively look left and right, fore and aft, up and down, or any combination of these directions. Also, the mirror angles with respect to the screen can be varied for changing the center of rotation of the light rays to change the view received on the screen, and additional lenses to invert the screen images and to increase the field of view are also, obviously, within the teachings of the present invention.

It is also readily apparent that conventional infrared image tube equipment could be added to the described instrumentation system to permit use thereof in the infrared spectrum, with the infrared rays being converted to a visible light when directed onto the viewing screen. Other obvious modifications of the present invention would be the additon of light amplifying screens to increase the image intensities observed, as well as the use of photosensors at the screen to feed the information received thereon to automatic control systems, or remote controls stations for remote vehicle control, in the absence of an onboard pilot, or in the event of pilot disability during flight trajectory.

In addition to the above modifications, the present invention may also be used to line up a space vehicle to a known plane in space by employing a suitable reticle on the screen, such for example, indicia arranged on the reticle to conform to certain known star patterns, with the vehicle attitude orientation being controlled so as to follow the predetermined flight program relative to the star pattern displayed on this specific type reticle.

When employing the present invention as a guidance indicator of this type, with stars used for the reference images, the reference points may be considered as fixed or stationary since the star distance is so great that the relative vehicle movement is, for all practical purposes, nullified.

Another obvious modification of the present invention would be to provide an automatic changer for the screen reticles in lieu of the herein described manual system. This could be readily accomplished by use of conventional mechanism, such as used on well known photographic slide projectors, or by a movie-type projector, with the different screen reticles being formed on film slides or strips. This modification could prove highly advantageous when effecting changing flight programs to coincide with changing and predetermined foreseeable situations in various exploratory and experimental flights and aborts thereof.

Although the present invention has been described as relating primarily to take-off and flight maneuvers, it is equally useful and applicable during vehicle landing, with the proper vehicle attitude and altitude during landing approach being calculated in advance and symbolized on a suitable reticle screen.

In addition to the many other obvious advantages of the present invention, the pilot of an aircraft or space vehicle may use the present invention to confirm the vehicle position indicated by other onboard instrumentation, as a check measure, or, where there exists a question as to the reliability of the vehicle position indicated by the electronic instrumentation.

It is thus seen that the present invention provides a needed, relatively simple, and reliable optical instrument for combining altitude and attitude in one display in such manner that erroneous readings are minimized. This lightweight instrument, which requires no external power source, is ideally suited as a backup or prime system for use in the guidance of aircraft and space vehicles.

The operational advantages and the adaptability of the herein described optical instrument will now be readily apparent, as will be the obviousness of utilizing the herein described invention in controlling the take-off and flight trajectory of high-speed aircraft and space vehicles. Obviously many other modifications and variations in the present invention than those specified herein are possible in the light of the above teachings. It is therefore to be understood that, within the scope of the appended claims, the invention may be practiced otherwise than as specifically described.

What is claimed as new and desired to be secured by Letters Patent of the United States is:

1. Apparatus for visually displaying attitude and altitude information encountered during the operation of a space vehicle comprising:
   a pair of identical lenses disposed in spaced coaxial relationship to each other,
   a prism intermediate said pair of lenses adapted to receive and redirect light rays received by said lenses,
   means to maintain the light rays from each lens separate from the light rays of the other lens when redirected from said prism, and
   screen means to receive the redirected light rays from said prism, said screen means being disposed from said pair of lenses a distance equal to the lens focal length, and reticle means for said screen means having indicia thereon corresponding to a desired predetermined vehicle attitude and altitude flightpath during a scheduled take-off or landing maneuver.

2. Apparatus for visually displaying attitude and altitude information encountered during the operation of a space vehicle comprising:
   a pair of identical lenses disposed 180° to each other in spaced relation,
   a prism intermediate said pair of lenses adapted to receive and redirect the light rays received by said lenses, along parallel paths perpendicular to the direction from that received,
   means to maintain the light rays from each lens separate from the light rays of the other lens when redirected from said prism,
   screen means to receive the redirected light rays from said prism,
   said screen means being vertically divided so as to display the image received from each lens on an identical portion thereof with the respective images being in side-by-side relationship, indicia means for said screen so constructed and arranged as to visually indicate vehicle attitude and altitude by the reference image positions received thereon.

3. Apparatus for detecting and visually displaying vehicle attitude and altitude information encountered during the operation of a space vehicle comprising:

a pair of identical focal length lenses disposed 180° to each other in spaced relation, a right angle prism intermediate said pair of lenses adapted to receive and redirect light rays received by said lenses, means to maintain the light rays from each lens separate from the light rays of the other lens when redirected from said prism, screen means to receive the redirected light rays from said prism and disposed a distance from said lenses equal to the lens focal length, reticle means on said screen having indicia thereon so calibrated as to display vehicle attitude and altitude information as the reference light rays are received by said screen.

4. An optical instrument for use in combination with a space vehicle to visually determine vehicle altitude and attitude information during take-off from and and landing of said vehicle on a planetary surface and comprising:

means within said vehicle for forming a pair of images of the planetary horizon at stations spaced 180° relative to each other, means for receiving the formed images within said vehicle, screen means on the instrument panel of said vehicle for displaying the pair of images thereon in side-by-side relationship, means on said screen means for indicating the angle and position of the two displayed images, with respect to each other and with respect to a local vertical plane, and providing vehicle altitude and attitude information with respect to the planet from which the horizon images are taken.

References Cited

UNITED STATES PATENTS

| | | | |
|---|---|---|---|
| 854,310 | 5/1907 | Robertson | 88—2.7 X |
| 1,708,746 | 4/1928 | Von Hofe | 350—32 |
| 2,818,778 | 1/1958 | Falciglia | 88—1 X |
| 2,854,882 | 10/1958 | Cooper | 350—9 X |
| 3,087,154 | 4/1963 | Kuecken | 350—174 X |
| 3,107,168 | 10/1963 | Hogan et al. | 350—33 X |
| 3,136,208 | 6/1964 | Magson | 350—25 X |
| 3,237,010 | 2/1966 | Elliott et al. | 88—1 X |
| 3,237,194 | 2/1966 | Curry et al. | 350—174 X |

DAVID SCHONBERG, *Primary Examiner.*

T. H. KUSMER, *Assistant Examiner.*

U.S. Cl. X.R.

350—171; 356—150, 154, 164